United States Patent Office 3,497,513
Patented Feb. 24, 1970

3,497,513
9-PHENYL-1,5-DIAZABICYCLO[4.3.0]NONANES
William J. Houlihan, Mountain Lakes, N.J., assignor to Sandoz-Wander, Inc., a corporation of Delaware
No Drawing. Filed July 21, 1966, Ser. No. 566,751
Int. Cl. C07d 51/00, 57/00
U.S. Cl. 260—250          8 Claims

ABSTRACT OF THE DISCLOSURE 9-phenyl and lower alkoxy or chlorine substituted phenyl-1,5-diazabicyclo[4.3.0]nonanes and their pharmacologically acceptable salts are useful as analgesics and central nervous system stimulants. The lower alkyl halide salts are also useful intermediates in preparing diazocyclononanes.

---

This invention relates to novel heterocyclic compounds. In particular, the invention pertains to 1,5-diazacyclononanes and methods for preparing the same. The invention also relates to intermediates which are useful in preparing the above compounds and processes for preparing said intermediates.

The end compounds of the present invention may be represented structurally as follows:

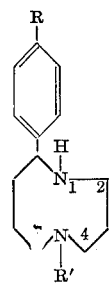

wherein:

R represents hydrogen; or lower alkoxy, preferably containing from 1 to 4 carbon atoms, e.g., methoxy, ethoxy, propoxy and butoxy; and R' represents straight chain lower alkyl, preferably containing from 1 to 4 carbon atoms, e.g., methyl, ethyl, propyl and butyl.

The above compounds may be prepared by reacting 3-benzoylpropionic acid or an appropriately substituted derivative thereof with 3-hydrazinopropanol to form the corresponding 2 - (3 - hydroxypropyl) - 6 - phenyl - 4,5-dihydropyridazin(2H)-3-one. The latter is then either converted (via halide synthesis) to the corresponding 2-(3-chloropropyl) - 6 - phenyl - 4,5 - dihydropyridazin(2H)-3-one or reduced to form the corresponding 1-(3-hydroxypropyl)-3-phenyl-hexahydropyridazine. Either of the compounds thus obtained is then converted to the corresponding 9-phenyl-1,5-diazabicyclo[4.3.0]nonane which in turn is reacted with an alkyl halide to form the N$_5$-(lower alkyl) halide salt thereof. The latter is then converted to the desired 1,5-diazacyclononane by treatment with sodium and liquid ammonia.

The above process may be illustrated structurally as follows:

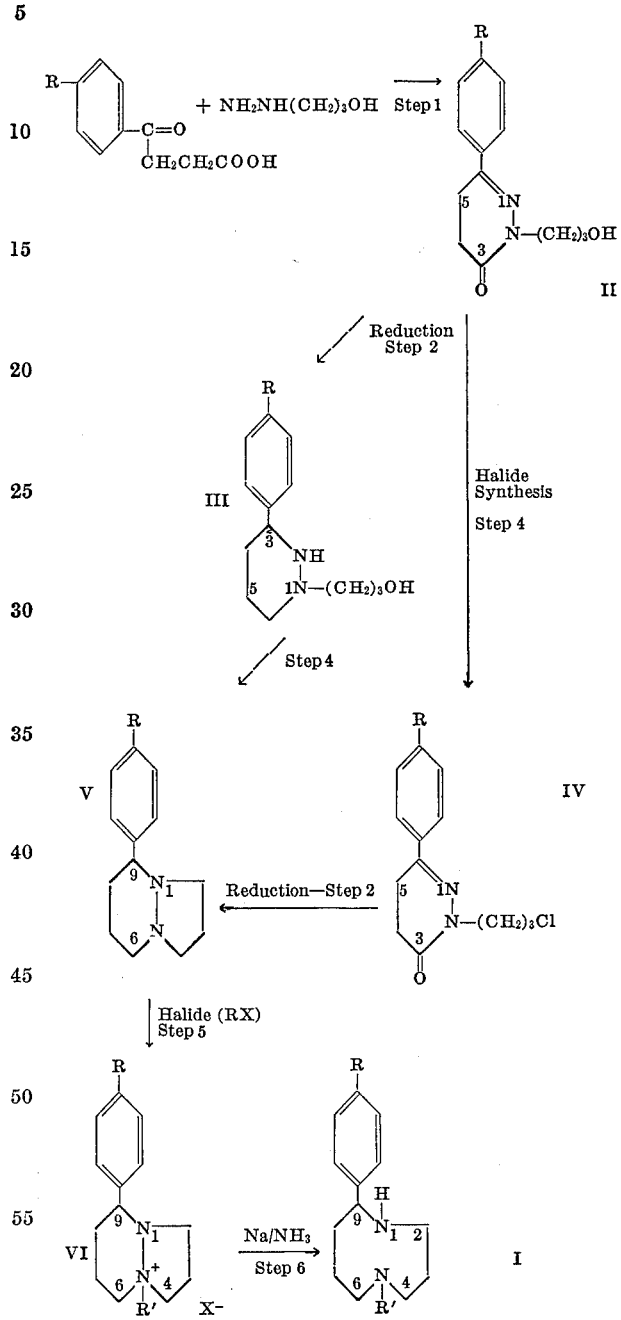

In the above formulae R and R' are as defined except that with respect to Formulas II, III, IV, V and VI, R additionally can be chloro, and X represents halogen having an atomic weight of at least 35, i.e., chloro, bromo or iodo.

As illustrated above, Step 1 of the process involves the reaction of a 3-benzoylpropionic acid with 3-hydrazinopropanol to form the corresponding 2-(3-hydroxypropyl)-6-phenyl-4,5-dihydropyridazin(2H)-3-one (II). This reaction is conveniently carried out in the presence of an inert organic solvent and at elevated temperatures. However, neither the solvent nor temperature employed is critical. Suitable solvents include benzene, toluene, xylene and chlorobenzene. Preferably, the reaction is carried out at reflux temperature to facilitate continuous removal of water. To facilitate the formation of water, the reaction may be carried out in the presence of a catalytic amount of hydrogen ions such as by the use of an arylsulfonic acid, e.g., benzenesulfonic acid, p-toluenesulfonic acid and the like. The resulting product (II) can be readily isolated employing conventional techniques.

The reduction (Step 2) of the pyridazinone (II) or (VI) to the corresponding pyridazine (III) or diazabicyclononane (V), respectively, is readily carried out employing a hydride reducing agent, preferably an aluminum hydride, such as lithium aluminum hydride, butyl aluminum hydride, triisobutyl aluminum hydride and the like. The reduction is conveniently effected in the presence of an inert organic solvent and at an elevated temperature, preferably reflux temperature. Suitable solvents include the ethers, such as diethyl ether and the like, and mixtures of ethers and benzene or toluene. However, neither the solvent nor temperature employed is critical. The resulting products (III) or (V) are readily recovered in conventional manner.

Step 3 of the process involves the conversion of the 2-(3-hydroxypropyl)-pyridazinone (II) to the corresponding 2-(3-chloropropyl)-pyridazinone (IV). This is accomplished in standard manner employing any of the conventional agents used for this purpose. The preferred agent, however, is thionyl chloride. The reaction is conveniently carried out in any suitable inert organic solvent, such as, for example, benzene, hexane, dichloromethane, chloroform and carbon tetrachloride. It is preferred to carry out the reaction at reflux temperature, but it can be carried out at room temperature (20° C.) if desired. The resulting product (IV) can be readily recovered in conventional manner.

The conversion of the pyridazine (III) to the corresponding diazabicyclononane (V), as indicated by Step 4 of the above reaction scheme is effected employing the same conditions as set forth for Step 3. This reaction provides via halide synthesis and spontaneous ring closure the diazabicyclononane (V).

Steps 5 and 6 of the process involve the introduction of the alkyl substituent (R') into the ring system followed by the opening of the nitrogen-nitrogen bond in the ring. In Step 5 the diazabicyclononane (V) is reacted with an appropriate halide to form the corresponding $N_5(R')$ halide salt thereof (VI). This reaction is conveniently carried out in the presence of a suitable inert organic solvent, such as, for example, diethyl ether, pentane, hexane, benzene, toluene, xylene, dichloromethane and chloroform. It is preferred to carry out the reaction at room temperature or below although elevated temperatures up to reflux temperature can be employed if desired. The resulting halide salt (VI), which is readily isolated employing conventional techniques, is then converted to the desired corresponding 1,5-diazacyclononane (I) by reacting the halide salt (VI) with sodium in the presence of liquid ammonia (Step 6). The reaction is conveniently carried out at atmospheric pressure and at a temperature at which ammonia is a liquid, i.e., below −30° C. Preferably, the reaction is carried out at the temperature afforded by a Dry Ice-acetone bath (−86° C.). In carrying out the reaction a solvent is not necessary since an excess of liquid ammonia can be used for this purpose. It should be noted that the formation of the diazacyclononane via the reaction of the halide salt (VI) with sodium and liquid ammonia is indeed unusual. The resulting diazacycononane (I) is readily recovered in conventional manner.

With respect to the last step of the process (Step 6) it will be appreciated that when the halide salt (VI) contains a chloro substituent attached to the benzene ring, the subsequent treatment thereof with sodium and liquid ammonia will also serve to remove such chloro substituent thereby yielding the corresponding 9-phenyl-1,5-diazacyclononane.

With respect to the various steps of the process discussed above, it is possible that the solvent employed therein can be dispensed with if any of the reactants employed are liquids at the temperature at which the reaction is conducted. In such instances an excess of such reactant can be used in lieu of the solvent.

Various of the propionic acids employed in Step 1 of the process are known and can be prepared as described in the literature. Such others which are not specifically disclosed in the literature may be readily prepared from available materials by methods analogous to those described in the literature for the preparation of the known compounds.

All of the compounds of structural Formulas I, III, V and VI have asymetric centers and therefore exist as optically active isomers. Separation and recovery of the respictive isomers may be readily accomplished employing conventional techniques and such isomers are included within the scope of this invention.

The end compounds of the present invention in their free base form (compounds of Formula I) are useful because they possess pharmacological activity. In particular, such compounds are central nervous system stimulants and can be used as anti-depressants. Such compounds are also useful as hypotensives and local anesthetics. The intermediate compounds of Formula V (in their free base form) are also useful as analgesics and central nervous system stimulants (antidepressants).

For the above uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulfate, phosphate and the like and the organic acid salts such as the succinate, benzoate, acetate, maleate, p-toluenesulfonate, benzenesulfonate and the like.

As noted above, the compounds of Formulas I and V exist as optical isomers. In some cases greater pharmacological activity or other beneficial attribute may be found with respect to a particular isomer, and in such instances administration of such isomer may be preferred.

For the above mentioned uses, the dosage administered will, of course, vary depending on the compound employed, the therapy desired and mode of administration. However, in general, satisfactory results are obtained with compounds of Formula I when administered at a daily dosage of from about 10 milligrams to about 150 milligrams, preferably given in divided doses of from about 2.5 milligrams to about 75 milligrams throughout the day or in sustained release form. Satisfactory results are achieved with compounds of Formula V when administered at a daily dosage of from about 50 milligrams to about 500 milligrams, preferably given in divided doses of from about 12.5 milligrams to about 250 milligrams throughout the day or in sustained release form.

Representative formulations suitable for oral administration are tablets prepared by standard tabletting techniques and containing the following.

| Ingredient: | Parts by weight |
| --- | --- |
| 5-methyl-9-phenyl - 1,5 - diazacyclononane (or acid addition salt thereof) or 9-(p-chlorophenyl)-1,5-diazabicyclo - [4.3.0]nonane (or acid addition salt thereof) | [1] 50 |
| Tragacanth | 2 |
| Lactose | 39.5 |
| Corn starch | 5 |
| Talcum | 3 |
| Magnesium stearate | 0.5 |

[1] Calculated as the free base.

EXAMPLE 1

9-(p-methoxyphenyl)-1,5-diazabicyclo[4.3.0]nonane

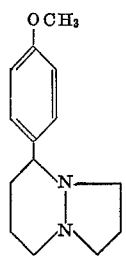

Step A: Preparation of 2-(3-hydroxypropyl)-6-(p-methoxyphenyl) - 4,5 - dihydropyridazin(2H)-3-one.—To a flask equipped with a condenser, Dean-Stark tube and stirrer is added 20.8 g. (0.10 mole) of 3-p-methoxybenzoylpropionic acid, 13.5 g. (0.15 mole) of 3-hydrazinopropanol and 250 ml. of toluene. The mixture is stirred and refluxed until water ceases to separate in the Dean-Stark tube. The solvent is then removed in vacuo on a rotary evaporator to yield an oil which solidified on standing. The resulting solid material is crystallized from chloroform-pentane to obtain 2-(3-hydroxypropyl)-6-(p-methoxyphenyl) - 4,5 - dihydropyridazin(2H)-3-one, M.P. 117–118° C.

Step B: Preparation of 1-(3-hydroxypropyl)-3-(p-methoxyphenyl)-hexahydropyridazine.—To a flask equipped with a stirrer, condenser, gas inlet tube and Soxhlet tube containing 50.0 g. (0.2 mole) of 2-(3-hydroxypropyl)-6-(p - methoxyphenyl) - 4,5-dihydropyridazin(2H)-3-one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered, and the filtrate concentrated on a rotary evaporator to obtain 1-(3-hydroxypropyl)-3-(p-methoxyphenyl)-hexahydropyridazine as a viscous oil.

Step C: Preparation of 9-(p-methoxyphenyl)-1,5-diazabicyclo[4.3.0]nonane.—To a flask equipped with a stirrer, condenser and dropping funnel is added 50.0 g. (0.20 mole) of 1-(3-hydroxypropyl)-3-(p-methoxyphenyl)-hexahydropyridazine and 500 ml. of dry chloroform. While stirring the mixture at room temperature, 21.3 ml. (0.3 mole) of thionyl chloride is added and the resulting mixture refluxed overnight. The chloroform solution is then washed first with 10% aqueous sodium bicarbonate solution until the wash is alkaline and then with saturated aqueous sodium chloride solution, and the combined washings extracted twice with chloroform. The combined chloroform layers are then dried with sodium sulfate, filtered and the filtrate evaporated in vacuo on a rotary evaporator to yield crude 9-(p-methoxyphenyl)-1,5-diazabicyclo[4.3.0]nonane, B.P. 140–152° C./6.5 mm.

EXAMPLE 2

9-(p-chlorophenyl)-1,5-diazabicyclo[4.3.0]nonane

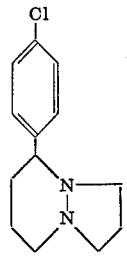

Step A: Preparation of 2-(3-hydroxypropyl)-6-(p-chlorophenyl)-4,5-dihydropyridazin(2H)-3-one.—To a flask equipped with a condenser, Dean-Stark tube and stirrer is added 63.9 g. (0.30 mole) of 3-p-chlorobenzoylpropionic acid, 31.5 g. (0.35 mole) of 3-hydrazinopropanol and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from chloroform-pentane to obtain 2-(3-hydroxypropyl)-6-(p-chlorophenyl)-4,5-dihydropyridazin(2H)-3-one, M.P. 128–132° C.

Step B: Preparation of 1-(3-hydroxypropyl)-3-(p-chlorophenyl)-hexahydropyridazine.—To a flask equipped with a stirrer, condenser, gas inlet tube and Soxhlet tube containing 53.4 g. (0.20 mole) of 2-(3-hydroxypropyl)-6 - (p - chlorophenyl-4,5-dihydropyridazin(2H)-3-one is added under nitrogen atmosphere 14.3 g. (0.376 mole) of lithium aluminum hydride and 1500 ml. of absolute diethyl ether. The contents of the flask are stirred and refluxed for 80 hours and then cooled in an ice bath. To the cooled mixture is then added dropwise 28.6 ml. of 2 N sodium hydroxide and 42.9 ml. of water. The resulting mixture is then filtered, and the filtrate concentrated on a rotary evaporator to obtain 1-(3-hydroxypropyl)-3-(p-chlorophenyl)-hexahydropyridazine as a viscous oil. The latter solidifies on standing to yield product, M.P. 65–67° C.

Step C: Preparation of 9-(p-chlorophenyl)-1,5-diazabicyclo[4.3.0]nonane.—To a flask equipped with a stirrer, condenser and dropping funnel is added 18.0 g. (0.07 mole) of 1-(3-hydroxypropyl)-3-(p-chlorophenyl)-hexahydropyridazine and 200 ml. of dry chloroform. While stirring the mixture at room tetmperature, 7.6 ml. (0.105 mole) of thionyl chloride is added, and the resulting mixture refluxed overnight. The chloroform solution is then washed first with 10% aqueous sodium bicarbonate solution until the wash is alkaline and then with saturated aqueous sodium chloride solution, and the combined washings extracted twice with chloroform. The combined chloroform layers are then dried with sodium sulfate, filtered and the filtrate evaporated in vacuo on a rotary evaporator to yield crude 9-(p-chlorophenyl)-1,5-diazabicyclo[4.3.0]nonane, B.P. 145–155° C.

A solution of 2.0 g. of the free base in dry diethyl ether is treated with hydrogen chloride gas, and the resulting solid filtered off and dried to yield hygroscopic 9-(p-chlorophenyl) - 1,5-diazabicyclo[4.3.0]nonane hydrochloride, M.P. 147–152° C.

EXAMPLE 3

9-phenyl-1,5-diazabicyclo[4.3.0]nonane

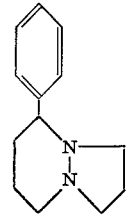

Step A: Preparation of 2-(3-hydroxypropyl)-6-phenyl-4,5-dihydropyridazin(2H)-3-one.—To a flask equipped with a condenser, Dean-Stark tube and stirrer is added 44.5 g. (0.25 mole) of 3-benzoylpropionic acid, 27 g. (0.3 mole) of 3-hydrazinopropanol, 1 g. of p-toluenesulfonic acid and 500 ml. of toluene. The mixture is stirred and refluxed until water ceases to separate in the Dean-Stark tube. The solvent is then removed in vacuo on a rotary evaporator to yield an oil which solidifies on standing. The resulting solid material is crystallized from benzene-pentane to obtain 2-(3-hydroxypropyl)-6-phenyl-4,5-dihydropyridazin(2H)-3-one, M.P. 65–68° C.

Step B: Preparation of 1-(3-hydroxypropyl)-3-phenylhexahydropyridazine.—To a flask equipped with a stirrer, condenser, gas inlet tube and Soxhlet tube containing 30.0 g. (0.13 mole) of 2-(3-hydroxypropyl)-6-phenyl-4,5-dihydropyridazin(2H)-3-one is added under nitrogen atmosphere 34.4 g. (0.9 mole) of lithium aluminum hydride and 200 ml. of absolute diethyl ether. The contents of the flask are stirred and refluxed for 80 hours and then cooled in an ice bath. To the cooled mixture is then added dropwise 68.8 ml. of 2 N sodium hydroxide and 103.2 ml. of water. The resulting mixture is then filtered, and the filtrate concentrated on a rotary evaporator to obtain 1-(3-hydroxypropyl)-3-phenyl-hexahydropyridazine as a viscous oil.

Step C: Preparation of 9 - phenyl - 1,5 - diazabicyclo [4.3.0]nonane.—To a flask equipped with a stirrer, condenser and dropping funnel is added 18.0 g. (0.08 mole) of 1 - (3 - hydroxypropyl) - 3-phenylhexahydropyridazine and 60 ml. of dry chloroform. While stirring the mixture at room temperature, a solution of 5.6 ml. of thionyl chloride in 16 ml. of chloroform is added and the resulting mixture refluxed overnight. The chloroform solution is then washed first with 10% aqueous sodium bicarbonate solution until the wash is alkaline and then with saturated aqueous sodium chloride solution, and the combined washings extracted twice with chloroform. The combined chloroform layers are then dried with sodium sulfate, filtered, the filtrate evaporated in vacuo on a rotary evaporator and the residue distilled to yield 9-phenyl-1,5-diazabicyclo[4.3.0]nonane, B.P. 93–95° C./0.7 mm.

A solution of 2.0 g. of the free base in dry diethyl ether is treated with hydrogen chloride gas, and the resulting solid filtered off and dried to yield hygroscopic 9-phenyl-1,5-diazabicyclo[4.3.0]nonane hydrochloride, M.P. 122–126° C.

EXAMPLE 4

9-(p-methoxyphenyl)-5-methyl-1,5-diazacyclononane

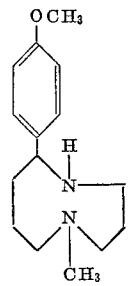

Step A: Preparation of $N_5$-methyl iodide salt of 9-(p-methoxyphenyl) - 1,5 - diazabicyclo[4.3.0]nonane.—To a flask equipped with a stirrer, dropping funnel and drying tube is added 24.2 g. (0.102 mole) of 9-(p-methoxyphenyl)-1,5-diazabicyclo[4.3.0]nonane and 500 ml. of diethyl ether. The mixture is stirred, and there is added thereto dropwise 19.0 ml. (0.204 mole) of methyl iodide. The resulting mixture is stirred overnight at room temperature, and the resulting solids filtered off and crystallized from methylene chloride-diethyl ether to yield the $N_5$-methyl iodide salt of 9-(p-methoxyphenyl)-1,5-diazabicyclo[4.3.0]nonane, M.P. 194–197° C.

Step B: Preparation of 9-(p-methoxyphenyl)-5-methyl-1,5-diazacyclononane.—A flask equipped with a magnetic stirring bar, drying tube and a gas inlet tube extending to the bottom of the flask is cooled in a Dry Ice-acetone bath. About 100 ml. of ammonia is then condensed in the flask and then 5.0 g. (0.13 mole) of $N_5$-methyl iodide salt of 9-(p-methoxyphenyl) - 1,5 - diazabicyclo[4.3.0]nonane is added to the flask. The resulting mixture is stirred and then 0.76 g. (0.033 mole) of sodium is added in small pieces. After addition of the sodium, the cooling bath is removed and the excess ammonia allowed to evaporate overnight. The residue is dissolved in a mixture of chloroform and ice water. The chloroform phase is extracted in 1 N hydrochloric acid until the aqueous extracts are acid and the acidified extracts made alkaline with sodium hydroxide pellets and then extracted with chloroform. The resulting chloroform extract is then evaporated on a rotary evaporator to yield 9-(p-methoxyphenyl)-5-methyl-1,5-diazacyclononane as a viscous oil. The base is dissolved in a mixture of diethyl ether-methylene chloride and the resulting solution treated with dry hydrogen chloride to obtain 9-(p-methoxyphenyl)-5-methyl-1,5-diazacyclononane dihydrochloride. No accurate melting point of the compound is determinable because of its hygroscopicity.

EXAMPLE 5

9-phenyl-5-methyl-1,5-diazacylononane

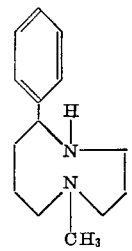

Step A: Preparation of $N_5$-methyl iodide salt of 9-phenyl-1,5-diazabicyclo[4.3.0]nonane.—A mixture of 5.0 g. (0.025 mole) of 9-phenyl - 1,5-diazabicyclo[4.3.0] nonane, 7.1 g. (0.05 mole) of methyl iodide and 100 ml. of absolute diethyl ether is stirred for 20 hours at room temperature and the resulting solids recovered by filtration to obtain the $N_5$-methyl iodide salt of 9-phenyl-1,5-diazabicyclo[4.3.0]nonane, M.P. 200–202° C.

Step B: Preparation of 9-phenyl-5-methyl - 1,5-diazacyclononane.—A flask equipped with a magnetic stirring bar, drying tube and gas inlet tube extending to the bottom of the flask is cooled in a Dry Ice-acetone bath. About 120 ml. of ammonia is then condensed in the flask and then 6.0 (0.0174 mole) of $N_5$-methyl iodide salt of 9-phenyl - 1,5-diazabicyclo[4.3.0]nonane is added to the flask. The resulting mixture is stirred and then 1.0 g. (0.0435 mole) of sodium is added in small pieces. After addition of the sodium, the cooling bath is removed and the excess ammonia allowed to evaporate overnight. The residue is dissolved in a mixture of chloroform and ice water. The chloroform phase is extracted with 1 N hydrochloric acid until the extracts are acid and the acidified extracts made alkaline with sodium hydroxide pellets and then extracted with chloroform. The resulting chloroform extract is then evaporated on a rotary evaporator to yield 9-phenyl-5-methyl-1,5-diazacyclononane. The base is dissolved in a mixture of diethyl ether-methylene chloride and the resulting solution treated with dry hydrogen chloride to obtain 9-phenyl-5-methyl - 1,5-diazacyclononane monohydrochloride. No accurate melting point of the compound is determinable because of its hygroscopicity.

EXAMPLE 6

9-phenyl-5-methyl-1,5-diazacyclononane

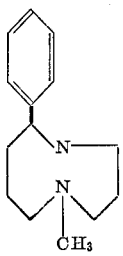

Step A: Preparation of $N_5$-methyl iodide salt of 9-(p-chlorophenyl) - 1,5-diazabicyclo[4.3.0]nonane.—A mixture of 6.0 g. (0.025 mole) of 9-(p-chlorophenyl)-1,5-diazabicyclo[4.3.0]nonane, 7.2 g. (0.05 mole) of methyl iodide and 120 ml. of absolute diethyl ether is stirred for 20 hours at room temperature, and the resulting solids recovered by filtration to obtain the $N_5$-methyl iodide salt of 9-(p-chlorophenyl)-1,5-diazabicyclo-[4.3.0] nonane, M.P. 199–202° C.

Step B: Preparation of 9-phenyl-5-methyl - 1,5-diazacyclononane.—Following the procedure of Step B of Example 5 and employing an additional equivalent of sodium and an equivalent amount of the $N_5$-methyl iodide salt of 9-(p - chlorophenyl) - 1,5 - diazabicyclo[4.3.0]nonane in place of the $N_5$-methyl iodide salt of 9-phenyl-1,5-diazabicyclo[4.3.0]nonane used therein, there is obtained 9-phenyl - 5 - methyl - 1,5 - diazacyclononane monohydrochloride.

What is claimed is:
1. A compound selected from the group consisting of diazabicyclononanes of the formula

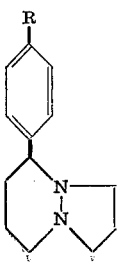

and non-toxic pharmaceutically acceptable acid addition salts thereof, wherein R represents hydrogen, chloro or lower alkoxy.

2. The compound of claim 1 which is 9-(p-methoxyphenyl)-1,5-diazabicyclo[4.3.0]nonane.

3. The compound of claim 1 which is 9-(p-chlorophenyl)-1,5-diazabicyclo[4.3.0]nonane.

4. The compound of claim 1 which is 9-phenyl-1,5-diazabicyclo[4.3.0]nonane.

5. A compound of the formula

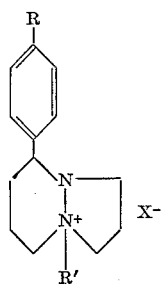

wherein:

R represents hydrogen, chloro or lower alkoxy;

R' represents straight chain lower alkyl; and

X represents halogen having an atomic weight of at least 35.

6. The compound of claim 5 which is the $N_5$-methyl iodide salt of 9-(p-methoxyphenyl) - 1,5-diazabicyclo-[4.3.0]nonane.

7. The compound of claim 5 which is the $N_5$-methyl iodide salt of 9-(p-chlorophenyl)-1,5-diazabicyclo[4.3.0] nonane.

8. The compound of claim 5 which is the $N_5$-methyl iodide salt of 9-phenyl-1,5-diazabicyclo[4.3.0]nonane.

References Cited
UNITED STATES PATENTS 3,420,831  1/1969  Houlihan _____ 260—250
3,420,832  1/1969  Houlihan _____ 260—250

NICHOLAS S. RIZZO, Primary Examiner

U.S. Cl. X.R.
260—239; 424—250